United States Patent
Peterson et al.

(10) Patent No.: US 9,183,722 B1
(45) Date of Patent: Nov. 10, 2015

(54) ADJUSTING LIGHT EMITTED BY A DEVICE BASED ON CHARGE OR DISCHARGE RATE OF A BATTERY ASSOCIATED WITH THE DEVICE

(71) Applicant: LENOVO (SINGAPORE) PTE. LTD., New Tech Park (SG)

(72) Inventors: Nathan J. Peterson, Durham, NC (US); Amy Leigh Rose, Chapel Hill, NC (US); Jennifer Lee-Baron, Morrisville, NC (US); John Scott Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 3 days.

(21) Appl. No.: 14/270,771

(22) Filed: May 6, 2014

(51) Int. Cl.
  *G08B 21/00* (2006.01)
  *G08B 21/18* (2006.01)
  *G08B 5/36* (2006.01)

(52) U.S. Cl.
  CPC . *G08B 21/18* (2013.01); *G08B 5/36* (2013.01)

(58) Field of Classification Search
  CPC ... H02J 7/0047; G01R 31/3606; Y10S 320/21
  USPC ............... 340/636.1, 636.11, 636.12, 636.13, 340/636.16, 636.19, 636.2, 641, 691.6, 340/693.1; 702/63; 320/107, 112, 132, 136
  See application file for complete search history.

(56) References Cited

U.S. PATENT DOCUMENTS

| | | | |
|---|---|---|---|
| 5,898,290 A * | 4/1999 | Beard et al. | 307/150 |
| 7,191,077 B2 | 3/2007 | Mese et al. | |
| 8,125,186 B2 * | 2/2012 | Carkner | 320/132 |
| 8,729,862 B2 | 5/2014 | Yebka et al. | |
| 2004/0222768 A1 | 11/2004 | Moore et al. | |

OTHER PUBLICATIONS

Bouziane Yebka, Joseph Anthony Holung, Phiip John Jakes, "Battery with Cathode Materials for Charging at Different Rates" related pending U.S. Appl. No. 14/658,733, filed Mar. 16, 2015.
John Weldon Nicholson, Axel Ramirez Flores, Howard Jeffrey Locker, Scott Edwards Kelso, John Miles Hung, Kenneth Scott Seethaler, Larry Glenn Estes, Jeremy Robert Carlson, "System and Methods to Increase and Decrease Charging Current to Battery" file history of related pending U.S. Appl. No. 14/143,429, filed Dec. 30, 2014.

* cited by examiner

*Primary Examiner* — Toan N Pham
(74) *Attorney, Agent, or Firm* — John L. Rogitz; John M. Rogitz (57) ABSTRACT

In one aspect, a device includes a battery, a display, a processor, and a memory accessible to the processor. The memory bears instructions executable by the processor to detect a rate of charge of the battery or a rate of discharge of the battery and, based at least in part on the detected rate, actuate at least one of the display and a light on the device other than the display to indicate the detected rate. The display and/or light are actuated based on the detected rate without user input to actuate the display or the light to indicate the detected rate, and without user input to detect or determine the rate of charge of the battery or discharge of the battery.

22 Claims, 6 Drawing Sheets

| Rate (C/t) | Scale No. | Indicator |
|---|---|---|
| K-K' | 10 | green (luminosity 10) (blink rate 10) |
| J-J' | 9 | green (luminosity 9) (blink rate 9) |
| I-I' | 8 | green (luminosity 8) (blink rate 8) |
| H-H' | 7 | green (luminosity 7) (blink rate 7) |
| G-G' | 6 | green (luminosity 6) (blink rate 6) |
| F-F' | 5 | green (luminosity 5) (blink rate 5) |
| E-E' | 4 | green (luminosity 4) (blink rate 4) |
| D-D' | 3 | green (luminosity 3) (blink rate 3) |
| C-C' | 2 | green (luminosity 2) (blink rate 2) |
| B-B' | 1 | green (luminosity 1) (blink rate 1) |
| A-A' | 0 | yellow (luminosity 10) (no blink) |
| L-L' | -1 | red (luminosity 1) (blink rate 1) |
| M-M' | -2 | red (luminosity 2) (blink rate 2) |
| N-N' | -3 | red (luminosity 3) (blink rate 3) |
| O-O' | -4 | red (luminosity 4) (blink rate 4) |
| P-P' | -5 | red (luminosity 5) (blink rate 5) |
| Q-Q' | -6 | red (luminosity 6) (blink rate 6) |
| R-R' | -7 | red (luminosity 7) (blink rate 7) |
| S-S' | -8 | red (luminosity 8) (blink rate 8) |
| T-T' | -9 | red (luminosity 9) (blink rate 9) |
| U-U' | -10 | red (luminosity 10) (blink rate 10) |

ADJUSTING LIGHT EMITTED BY A DEVICE BASED ON CHARGE OR DISCHARGE RATE OF A BATTERY ASSOCIATED WITH THE DEVICE

I. FIELD

The present application relates generally to adjusting light emitted by and indications presented on a device based on a charge or discharge rate of a battery associated with the device.

II. BACKGROUND

It is often difficult for a user to determine a current and accurate rate of charge or discharge of a battery for a device. This can be due to many factors, including having to close one application in order to view battery data in a battery-related application. However, between closing one application and opening the battery-related application, the battery charge or discharge rate can change owing to the change in consumption of device resources since an application has closed and a different one has opened. Thus, should the user wish to determine the charge or discharge rate of the battery while running a specific application(s) on the device other than the battery-related application, it is difficult if not impossible to get an accurate real-time appraisal.

Furthermore, it is often the case that a user may be manipulating a device while the device's battery is charging. However, owing to the user's manipulation of the device and hence consumption of power, the battery may not actually be charging even though e.g. the device indicates that the battery is charging based on the device being engaged with a charge source.

SUMMARY

Accordingly, in one aspect a device includes a battery, a display, a processor, and a memory accessible to the processor. The processor bears instructions executable by the processor to detect a rate of one of charge of the battery and discharge of the battery and, based at least in part on the detected rate, actuate at least one of the display and a light on the device other than the display to indicate the detected rate. The at least one of the display and the light on the device other than the display are actuated based at least in part on the detected rate without user input to actuate at least one of the display to indicate the detected rate and the light on the device other than the display to indicate the detected rate. Also, the at least one of the display and the light on the device other than the display are actuated based at least in part on the detected rate without user input to detect the rate of one of charge of the battery and discharge of the battery and without user input to determine the rate of one of charge of the battery and discharge of the battery.

In another aspect, a method includes monitoring rates of charge and discharge of a battery of a device while the device is engaged with a charge source and presenting an indication on the device of the rates of charge and discharge. The indication is not presented in response to input to the device from a user to present information on the rates of charge and discharge, nor is the indication presented in response to input to the device from a user to monitor the rates of charge and discharge.

In still another aspect, an apparatus includes a first processor, a network adapter, and storage. The storage bears instructions executable by a second processor for detecting, at least substantially in real time, a rate of one of charge of a battery and discharge of the battery, where the battery is coupled to a device associated with the second processor. The instructions are also for execution by the second processor for actuating, based at least in part on the detected rate and at least substantially in real time with the detecting, at least one of a display of the device and a light of the device other than display to indicate the detected rate by adjusting the luminosity of at least one of the display and the light to correspond to the detected rate. At least one of the display and the light are actuated without closing a window being presented on the display for an application other than an application for battery activity, and without presenting a window on the display associated with an application for battery activity. The first processor transfers the instructions over a network via the network adapter to the device.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
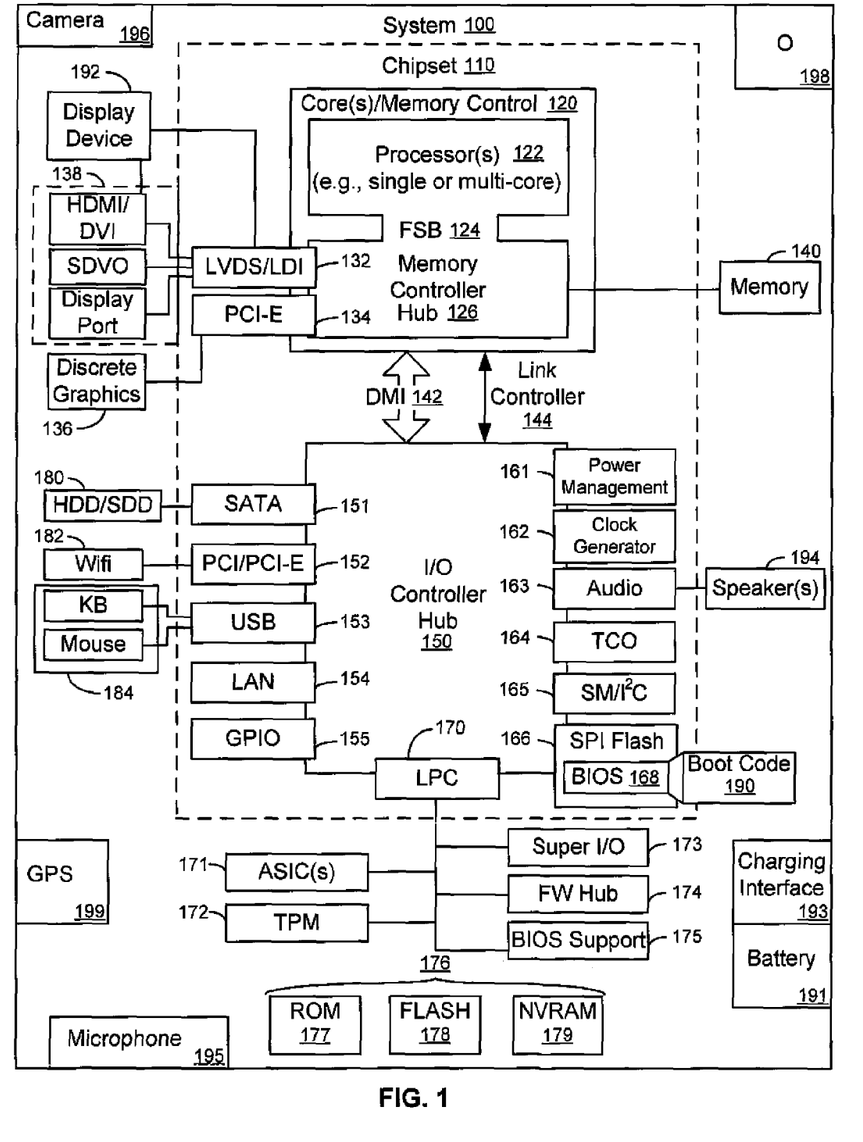
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

At least battery 191 is also shown as being coupled to the system 100, along with at least power source interface and/or charging interface 193 for interfacing the system 100 and/or battery 191 with a power source and/or for charging the battery 191. Also shown is at least one light 198 which may be e.g. a light emitting diode (LED). It is to be understood that the light 198 may be positioned at least partially on a portion of a housing for the system 100 that does not form part of the display device 192, and/or is on a portion of the display device 192 such as e.g. a generally-blackened periphery of the display device 192 not configured to present images, user interfaces, application windows, etc. It is to be further understood that the at least one light 198 may be configured to change colors emitted therefrom under control of the processor 122 such as e.g. being configured to emit green light, red light, and/or yellow light. Notwithstanding, it is to be understood that in some embodiments the at least one light 198 may be plural lights each being respectively configured to emit light of a different color such as e.g. green light, red light, and yellow light.

Still in reference to FIG. 1, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
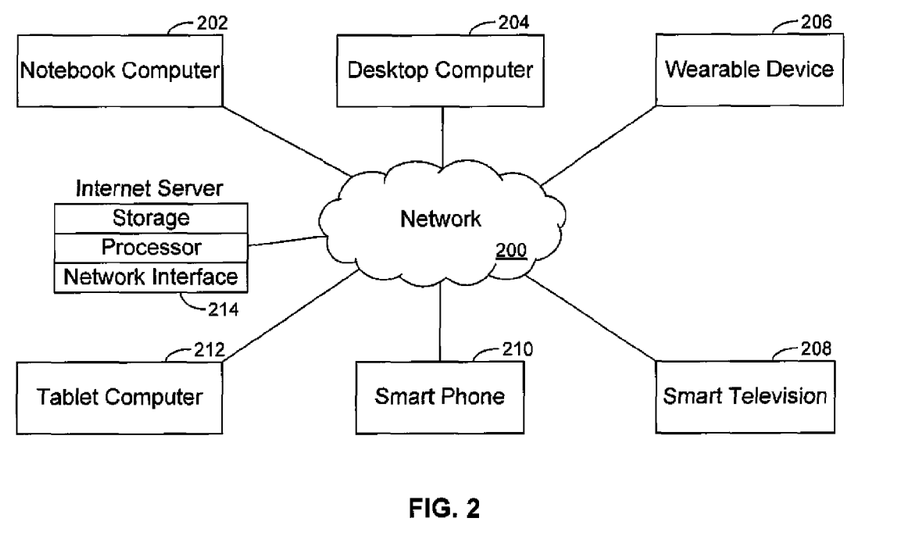
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
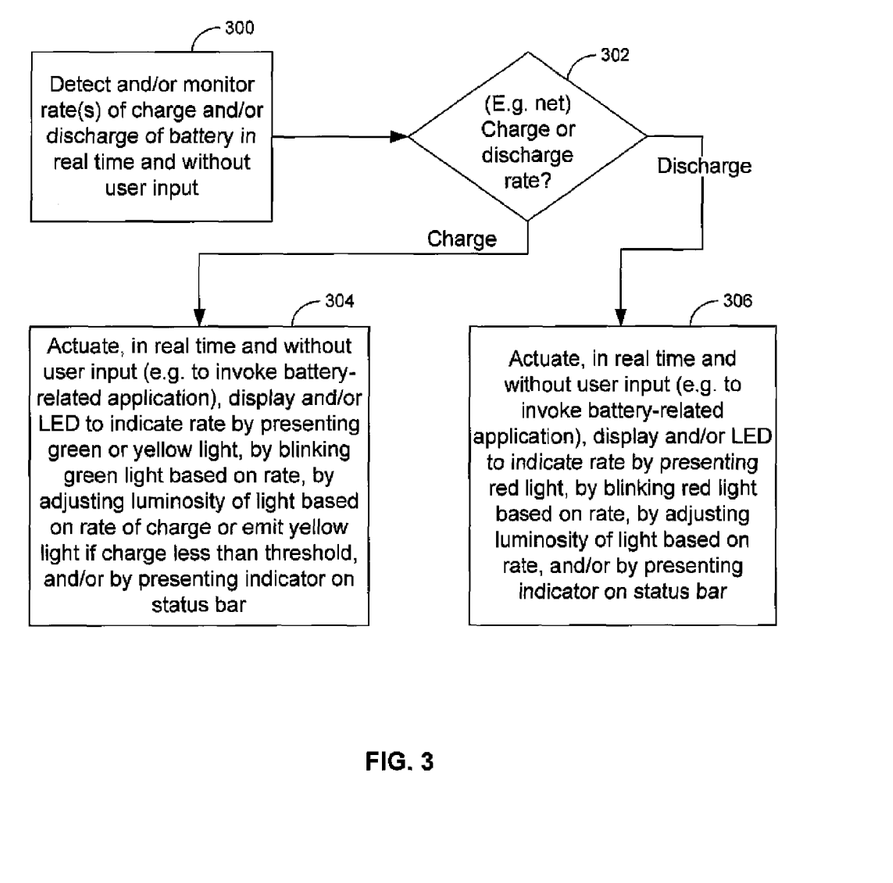
FIGS. 3 and 4 are flow charts showing example algorithms in accordance with present principles.

Referring to FIG. 3, it shows example logic that may be undertaken by a device such as the system 100 in accordance with present principles. Beginning at block 300, the logic detects and/or monitors the rate(s) of charge or discharge of a battery associated with the device undertaking the present logic (referred to below as the "present device") in real time and automatically (e.g. without user input to do so). The logic then proceeds to decision diamond 302, at which the logic determines whether the detected and/or monitored rate is a (e.g. net) charge or discharge rate.

A determination at diamond 302 of a (e.g. net) charge rate causes the logic to proceed to block 304. At block 304, the logic actuates, e.g. in real time and without user input (e.g. automatically based only the determination at diamond 302), the present device's display and/or an LED such as the LED 198 described above to indicate the charge rate. The charge rate is indicated on the display and/or LED at block 304 by one or more of presenting a green or yellow light (e.g. yellow being presented for a negligible charge rate and/or a charge rate of zero), blinking the green or yellow light and/or blinking another element or feature presented on the display and/or LED, presenting and/or adjusting the luminosity of the display and/or LED (and even e.g. the green or yellow light in particular) to a particular luminosity level corresponding to the rate of charge, and/or by presenting still other indicators of the charge rate such as one or more status bar indicators.

However, a determination at diamond 302 of a (e.g. net) discharge rate causes the logic to instead move from diamond 302 to block 306. At block 306, the logic actuates, e.g. in real time and without user input (e.g. automatically based only the determination at diamond 302), the present device's display and/or an LED such as the LED 198 described above to indicate the discharge rate. The discharge rate is indicated on the display and/or LED at block 306 by one or more of presenting a red light, blinking the red light and/or blinking another element or feature presented on the display and/or LED, presenting and/or adjusting the luminosity of the display and/or LED (and even e.g. the red light in particular) to a particular luminosity level corresponding to the rate of discharge, and/or by presenting still other indicators of the discharge rate such as one or more status bar indicators.

Figure 4:
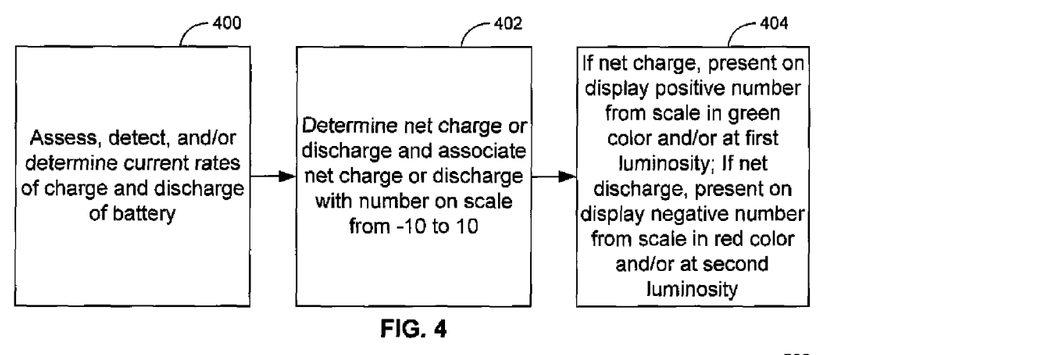

Continuing the detailed description in reference to FIG. 4, it shows example logic that may be undertaken by a device such as the system 100, and may be undertaken in conjunction with or separately from the logic of FIG. 3. In any case, at block 400 the device undertaking the present logic (referred to below as the "present device") assesses, detects, and/or determines current (e.g. real-time or at least substantially real-time) rates of charge and discharge of the battery. E.g., the battery may be receiving a charge from a charging source, but may also be discharging at the same time to power applications running on the device. In any case, from block 400 the logic moves to block 402 where the logic determines the net charge or discharge based on the assessment, detection, and/or determinations from block 400.

Also at block 402, the logic associates the net charge or discharge with a number on a scale from negative ten to positive ten. The logic may do so at block 402 by accessing a data table such as the one to be described in reference to FIG. 5, and comparing the assessed net charge rate to rate ranges listed in the data table until a range is located in which the assessed net charge rate is included and/or falls. Each range in the table has a number from the scale associated with it, and thus the logic may determine the number at block 402 by determining the range in which the assessed net rate falls and locating in the data table the number associated with that particular range.

After block 402, the logic proceeds to block 404. At block 404 and responsive to determining a net charge, the logic presents on a display of the device a positive number from the scale of negative ten to ten that corresponds to the particular net charge that is determined. The logic may present the number e.g. in green color to indicate a net charge and/or may present the number at a particular level of luminosity to indicate the amount of net charge. E.g., a higher net charge may be associated with a level of luminosity greater than a level of luminosity for a relatively lower net charge to thus correlate and convey to a user e.g. higher charge rates as being associated with higher luminosity levels and lower charge rates with lower luminosity levels.

Also at block 404, but responsive to determining a net discharge, the logic presents on a display of the device a negative number from the scale of negative ten to ten that corresponds to the particular net discharge that is determined. The logic may present the number e.g. in red color to indicate a net discharge (e.g. net charge loss of the battery) and/or may present the number at a particular level of luminosity to indicate the amount of net discharge. E.g., a higher net discharge may be associated with a level of luminosity greater than a level of luminosity for a relatively lower net discharge to thus correlate and convey to a user e.g. higher discharge rates with higher luminosity levels and lower discharge rates as being associated with lower luminosity levels.

Figure 5:
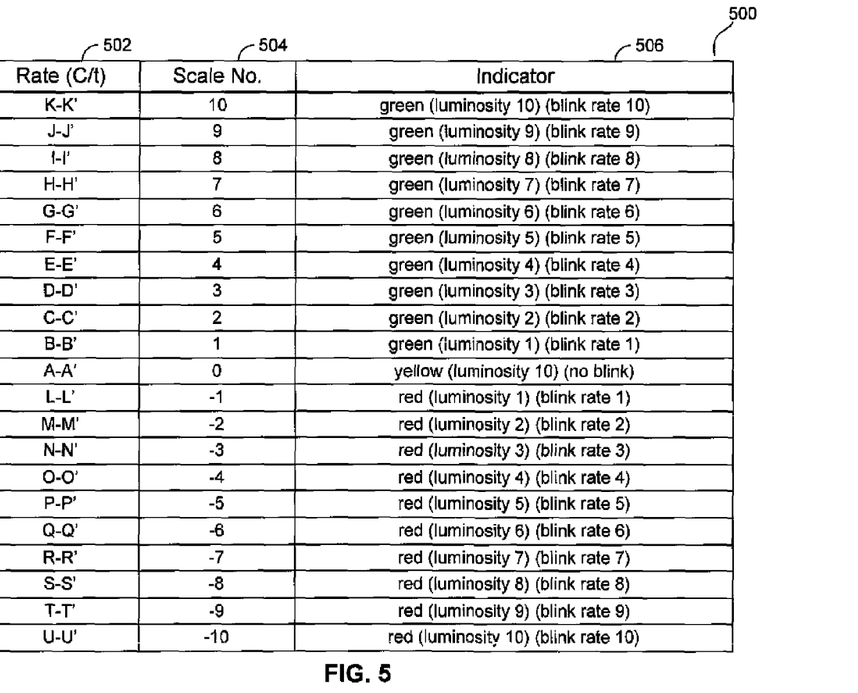
FIG. 5 is an example data table in accordance with present principles.

Now describing FIG. 5, it shows a data table 500 correlating ranges of charge and discharge rates with a number on a scale from negative ten to ten, and correlating the ranges with how an indicator may be presented on a device in accordance with present principles. Thus, the table 500 includes a first column 502 listing various rate ranges. For illustration, the ranges are represented on the example table 500 as alphabetical characters that are understood to connote different actual rate ranges. Furthermore, as indicated above each respective entry in column 502 is understood to pertain to a different rate range than the other entries such as e.g. the charge rate D to D' being different than the charge rate from E to E'. Also note that the rate ranges beginning with the letter L and continuing alphabetically to the letter U represent discharge rates which are understood to progressively increase in discharge rate from L to U, whereas the rate ranges from A and continuing alphabetically to the letter K represent charge rates which progressively increase from A to K. Further still, it is to be understood that in the example shown, the range from A-A' is understood to be a range from zero to a negligible and/or threshold charge rate from zero.

The table 500 also includes a second column 504 listing scale numbers respectively associated with different charge and discharge ranges. Thus, e.g. by accessing the data table 500 and comparing a real time, detected charge or discharge rate to the ranges in the first column 502, the logic may determine which range of the ranges listed in the first column 502 the real time detected rate falls within to thus determine the particular scale number associated with the particular range determined to be the one in which the current rate falls.

A third column 506 is also shown on the table 500. The column 506 contains information on e.g. presenting a scale number associated with the respective entry from column 506. As may be appreciated from column 506, scale numbers from one to ten are to be presented in green color, scale numbers from negative one to negative ten are to be presented in red color, and the scale number of zero may be presented in yellow color (it being understood that in other embodiments it may be e.g. presented in green color). Also note that the column 506 contains other information for presenting the scale number and/or for presenting other indicators described herein, such as the level of luminosity. E.g. a luminosity level of 1 as shown is understood to be associated with a less luminous presentation than e.g. a luminosity level of ten, with luminosity levels from two to nine being for levels which progressively increase in luminosity to the level ten.

Further still, the column 506 may contain information for blink rates of the respective numbers of the scale as well. A blink rate may be e.g. the rate at which the scale number repeatedly appears, disappears, and appears again in cycle. In any case, it is to be understood that a blink rate of one is a slower rate than a blink rate of ten (e.g. more time exists between the scale number disappearing and reappearing for the scale number one than for a faster blink rate for the scale number ten). Furthermore, note that the scale number of zero does not have a blink rate, and therefore in example embodiments the scale number zero when presented does not blink but instead is constantly presented.

Figure 6:
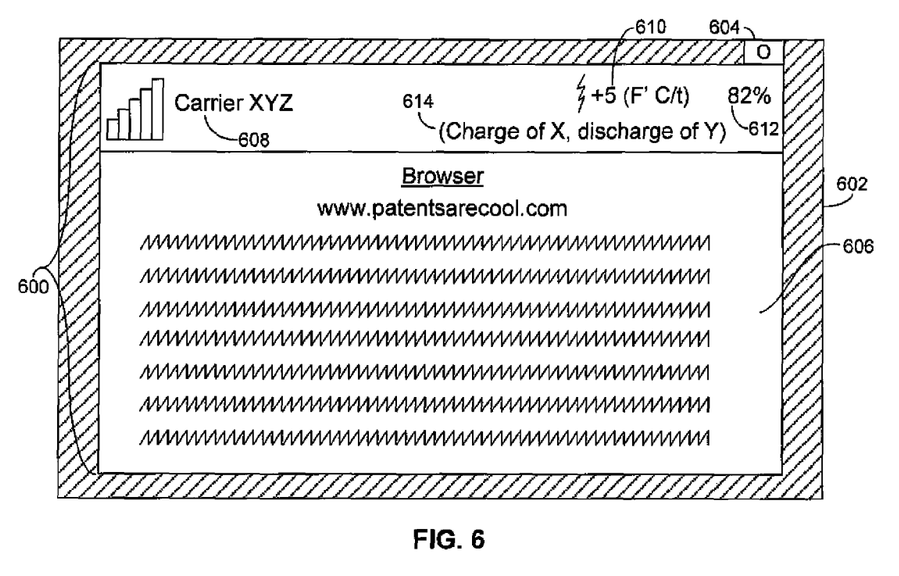
FIGS. 6-8 are example user interfaces (UI) in accordance with present principles.

Continuing the detailed description in reference to FIG. 6, it shows an example user interface (UI) 6000 presented on a device having a housing 602 in accordance with present principles. Also note that an LED 604 is shown on the housing 602 but does not form part of the touch-enabled display on which the UI 600 is presented. The LED 604 may be e.g. similar in function and configuration to the LED 198 described above.

As may be appreciated from FIG. 6, the UI 600 includes a portion 606 presenting an Internet browser, and a portion 608 presenting a status bar for the device. The status bar may include information such as e.g. the current time of day and the current signal strength for a wireless network to which the device is connected. As also shown in FIG. 6, the status bar 608 includes a lightening bolt indicator which indicates that the device is currently connected to a power source such as e.g. a wall outlet. The status bar 608 also includes the positive scale number 610 (in this case, the number is five) indicating a current real time charge rate associated with the scale number five when e.g. at least the browser application is running as shown, along with another indicator 612 pertaining to the amount of charge of the battery of the device (in this example, the battery has been charged to eighty two percent capacity).

Note that still other rate data may be presented on the status bar 608, such as e.g. particular charge rates and discharge rates 614 which result in a net charge rate used to determine the scale number 610. Also note that in some embodiments a number such as the number 610 may be negative instead of positive if e.g. a net discharge is determined to be occurring in real time.

Figure 7:
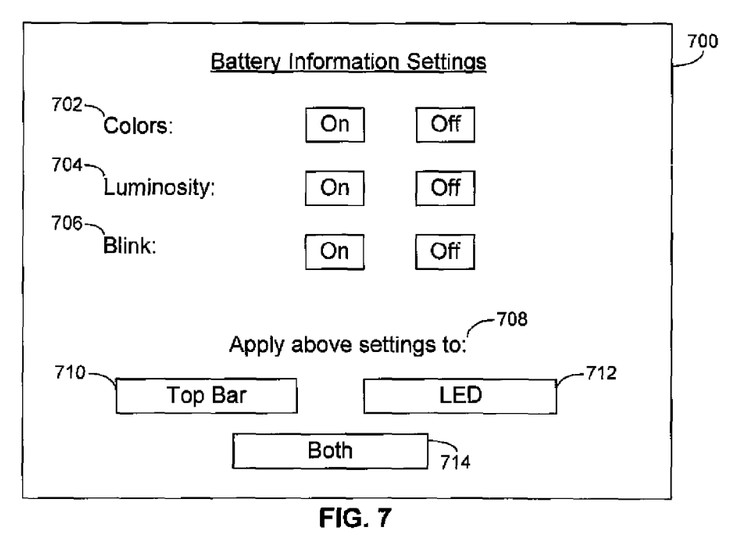

Now in reference to FIG. 7, it shows an example settings UI 700 that may be presented on a device undertaking present principles to configure battery information presentation settings. As may be appreciated from the UI 700, each of the respective settings 702, 704, and 706 has respective on and off selector elements associated therewith which are selectable to respectively turn the associated setting on or off automatically without further user input. In any case, the first setting 702 pertains to whether to present battery information (such as e.g. a number from a scale as discussed herein) in a color corresponding to charge or discharge of the battery in accordance with present principles. The second setting 704 pertains to whether to present battery information at various levels of luminosity based on the amount of charge or discharge in accordance with present principles. The third setting 706 pertains to whether to present battery information with a blink rate based on the amount of charge or discharge in accordance with present principles.

In addition to the foregoing, the UI 700 includes a fourth setting 708 for configuring the device to apply the settings 702, 704, and 706 to one or both of e.g. a top status bar presented on a touch-enabled display of the device, another light (e.g. an LED on the housing of the device), or both the display and the light automatically responsive to respective input to one of selector elements 710, 712, and 714.

Figure 8:
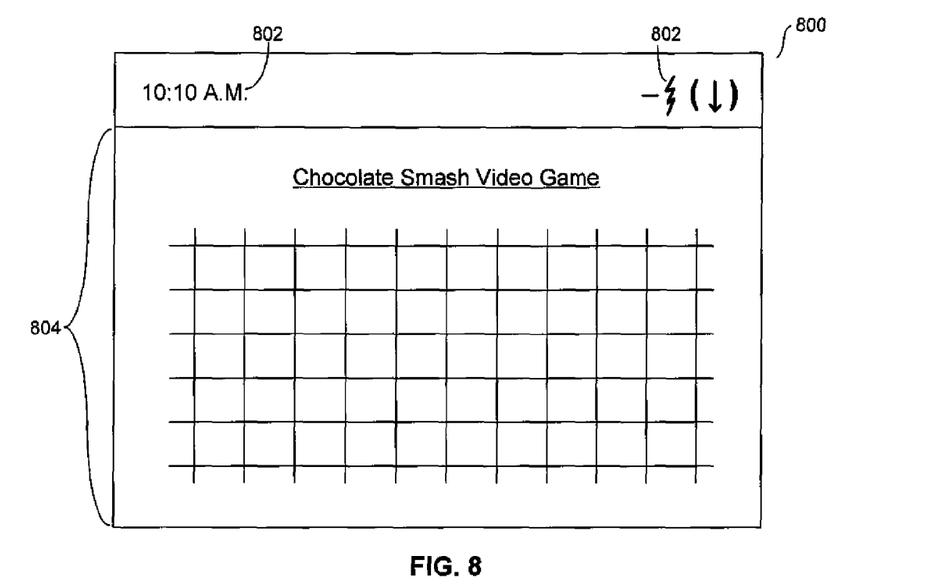

Now in reference to FIG. 8, it shows another example UI 800 with a status bar 802 for presenting battery charge and/or discharge data in accordance with present principles. The UI 800 includes a section 804 presenting an active window for a video game that is being currently engaged in by a user. Based at least on the power being consumed by the video game application, an indicator 806 is presented on the status bar 802 e.g. in this example as a lightening bolt to indicate the device presenting the UI 800 is connected to a source of power. Note that the indicator 806 includes a negative sign in front of the lightening bolt to indicate that the battery of the device is currently undergoing a net discharge e.g. owing to the real-time power consumption of the video game application and any other currently running operations of the device. Furthermore note that the indicator 806 also includes a down arrow in parentheses as an additional indication of a net discharge despite the device being engaged with a power source.

Without reference to any particular figure, it is to be understood that in addition to or in lieu of presenting green, red, and/or yellow colored indicators at varying luminosities in accordance with present principles, the green, red, and yellow indicators may have their respective shades of color varied from dark to light based on low charge rate to high charge rate or low discharge rate to high discharge rate. Thus, e.g., a net charge of first rate may be indicated by a green indicator of a relatively dark green, and a net charge of a second rate faster than the first rate may be indicated by a green indicator of a lighter green than the relatively dark green.

Also without reference to any particular figure, it is to be understood that although e.g. zero, a negligible, and/or a threshold discharge rate (e.g. close to zero) are described above as being "charge rates" of zero, in other embodiments they may be considered "discharge rates," and accordingly indicators of such may be e.g. presented in a red color.

Still further, note that in some embodiments e.g. only two levels of luminosity may be used to indicate a (e.g. net) charge or discharge. Thus, e.g. a first luminosity level may be used responsive to detecting a net charge rate, whereas a second luminosity level lower than the first luminosity level may be used responsive to detecting a net discharge rate.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

In any case, it may now be appreciated that present principles allow for a user to determine and/or view battery information for a device without opening a battery-related application and/or window e.g. in the primary presentation area of a touch-enabled display and/or without closing a currently-running application and/or currently presented window. Hence, battery information may be viewed without changing the current, real-time power consumption of the device for which the user wishes to view power information. LEDs in accordance with present principles may also be used to indicate charge/discharge rates. E.g., the LED may emit green color for charge, red color for discharge, and may also present these colors in different brightness levels and/or shading levels based on the amount of charge or discharge. The green and red colors thus serve as visual indicators to a user and may dynamically change in real time as the user performs different actions on the device, runs or closes various applications, invokes different functions on the device, etc. Also note that a status bar in accordance with present principles may include a battery indicator and/or real time battery usage data. The foregoing may be done e.g. automatically without user input to actuate at least one of the touch-enabled display to indicate a detected rate and/or other charge/discharge data and without input to actuate an LED on the device to indicate the detected rate and/or other charge/discharge data. It may also be done without user input commanding the device to monitor, detect, or determine a rate and/or other charge/discharge data.

While the particular ADJUSTING LIGHT EMITTED BY A DEVICE BASED ON CHARGE OR DISCHARGE RATE OF A BATTERY ASSOCIATED WITH THE DEVICE is herein shown and described in detail, it is to be understood that the subject matter which is encompassed by the present application is limited only by the claims.

What is claimed is:

1. A device, comprising:
   a battery;
   a display;
   a processor; and
   a memory accessible to the processor and bearing instructions executable by the processor to:
   detect a rate of one of charge of the battery and discharge of the battery;
   based at least in part on the detected rate, actuate at least one of the display and a light on the device other than the display to indicate the detected rate;
   wherein at least one of the display and the light on the device other than the display are actuated based at least in part on the detected rate without user input to actuate at least one of the display to indicate the detected rate and the light on the device other than the display to indicate the detected rate; and wherein at least one of the display and the light on the device other than the display are actuated based at least in part on the detected rate without user input to detect the rate of one of charge of the battery and discharge of the battery and without user input to determine the rate of one of charge of the battery and discharge of the battery.

2. The device of claim 1, wherein the instructions are executable by the processor to:
actuate the display to indicate the detected rate.

3. The device of claim 2, wherein the instructions are executable by the processor to actuate the display to indicate the detected rate by adjusting a brightness level of the display based on the detected rate.

4. The device of claim 1, wherein the instructions are executable by the processor to:
actuate the light on the device other than the display to indicate the detected rate.

5. The device of claim 4, further comprising a light emitting diode (LED), wherein the light that is actuated is the LED.

6. The device of claim 5, wherein the LED is actuated to indicate the detected rate at least in part based on adjustment of a brightness level of the LED based on the detected rate.

7. The device of claim 5, wherein the LED is actuated to indicate the detected rate at least in part based on actuation of the LED to emit light of a green color based on detection of a rate of charge of the battery and to emit light of a red color based on detection of a rate of discharge of the battery.

8. The device of claim 7, wherein the LED is actuated to emit a relatively more luminous green light based on detection of a first rate of charge faster than a second rate of charge for which less luminous green light is emitted based on detection of the second rate of discharge.

9. The device of claim 7, wherein the LED is actuated to emit a relatively more luminous red light based on detection of a first rate of discharge faster than a second rate of discharge for which less luminous red light is emitted based on detection of the second rate of discharge.

10. The device of claim 5, wherein the LED is actuated to indicate a detected rate of charge of one of zero and a threshold from zero at least in part by actuation of the LED to emit light of a yellow color.

11. The device of claim 1, wherein the instructions are executable by the processor to:
actuate the light on the device other than the display to indicate the detected rate at least in part by actuating the light to blink at a first blink rate based on detection of a first rate of one of charge and discharge that is faster than a second respective rate of one of charge and discharge for which the light is actuated to blink at a second blink rate slower than the first blink rate.

12. The device of claim 1, wherein the instructions are executable by the processor to:
actuate the display to indicate the detected rate at least based on presentation of a first indicator of the detected rate on a status bar presented on the display, the first indicator being accompanied by a second indicator, the second indicator pertaining to an amount of charge of the battery.

13. The device of claim 1, wherein the instructions are executable by the processor to:
actuate the display to indicate the detected rate at least based on presentation of an indicator of the detected rate on the display, the indicator being based on a scale for charge rate and discharge rate.

14. The device of claim 13, wherein a scale range for the scale is from a negative number to a positive number, wherein positive numbers for the scale correspond rates of charge, and wherein negative numbers for the scale correspond to rates of discharge.

15. The device of claim 1, wherein the instructions are executable by the processor to:
detect the rate of one of charge of the battery and discharge of the battery at least substantially in real time; and
actuate at least one of the display and a light on the device other than the display to indicate the detected rate at least substantially in real time as the detected rate changes.

16. A method, comprising:
monitoring rates of charge and discharge of a battery of a device while the device is engaged with a charge source;
presenting an indication on the device of the rates of charge and discharge, the indication not being presented in response to input to the device from a user to present information on the rates of charge and discharge, the indication not being presented in response to input to the device from a user to monitor the rates of charge and discharge.

17. The method of claim 16, wherein the rates of charge and discharge are assessed to determine a net one of charge and discharge.

18. The method of claim 17, wherein the method includes:
responsive to determining a net charge, presenting the indication in a green color; and
responsive to determining a net discharge, presenting the indication in a red color.

19. The method of claim 17, wherein the indication is presented as emission of light of a first luminosity responsive to a determination of a net charge, and wherein the indication is presented as emission of light of a second luminosity less than the first luminosity responsive to a determination of a net discharge.

20. An apparatus, comprising:
a first processor;
a network adapter;
storage bearing instructions executable by a second processor for:
detecting at least substantially in real time a rate of one of charge of a battery and discharge of the battery, the battery being coupled to a device associated with the second processor;
based at least in part on the detected rate, actuating at least substantially in real time with the detecting at least one of a display of the device and a light of the device other than display to indicate the detected rate by adjusting a luminosity of at least one of the display and the light to correspond to the detected rate;
wherein at least one of the display and the light are actuated by adjusting the luminosity of at least one of the display and the light without closing a window being presented on the display for an application other than an application for battery activity, and without presenting a window on the display associated with an application for battery activity; and wherein the first processor transfers the instructions over a network via the network adapter.

21. A method, comprising:
detecting a rate of one of charge of a battery and discharge of the battery;
based at least in part on the detected rate, actuating at least one of a display on a device and a light on the device other than the display to indicate the detected rate;
wherein at least one of the display and the light on the device other than the display are actuated based at least in part on the detected rate without user input to actuate at least one of the display to indicate the detected rate and the light on the device other than the display to indicate the detected rate; and wherein at least one of the display and the light on the device other than the display are actuated based at least in part on the detected rate without user input to detect the rate of one of charge of the battery and discharge of the battery and without user input to determine the rate of one of charge of the battery and discharge of the battery.

22. A device, comprising:

a battery;

a processor;

a display accessible to the processor; and storage accessible to the processor and bearing instructions executable by the processor to:

monitor rates of charge and discharge of the battery while the device is engaged with a charge source;

present an indication on the device of the rates of charge and discharge, the indication not being presented in response to input to the device from a user to present information on the rates of charge and discharge, the indication not being presented in response to input to the device from a user to monitor the rates of charge and discharge.

* * * * *